J. H. ZOTTMAN,

Assignor of one-half interest to W. S. HOPKINS.

DIES FOR TRIMMING THE POINTS OF HORSESHOE NAILS.

No. 7,461. Reissued Jan. 9, 1877.

OLD FORM

Witnesses;
Grenville Lewis.
M. B. Church

Inventor.
John H. Zottman
By Hill, Ellsworth & Spear
His Attys.

N. PETERS, PHOTO-LITHOGRAPHER, WASHINGTON, D. C.

UNITED STATES PATENT OFFICE.

JOHN H. ZOTTMAN, OF VERGENNES, VERMONT, ASSIGNOR OF ONE-HALF INTEREST TO WILLIAM S. HOPKINS.

IMPROVEMENT IN DIES FOR TRIMMING THE POINTS OF HORSESHOE-NAILS.

Specification forming part of Letters Patent No. 182,509, dated September 19, 1876; reissue No. 7,461, dated January 9, 1877; application filed December 13, 1876.

*To all whom it may concern:*

Be it known that I, JOHN H. ZOTTMAN, of Vergennes, in the county of Addison and State of Vermont, have invented certain new and useful Improvements in Dies for Trimming or Shearing Horseshoe-Nails; and I do hereby declare the following to be a full, clear, and exact description of the same, reference being had to the accompanying drawings, forming part of this specification, in which—

Figure 1:
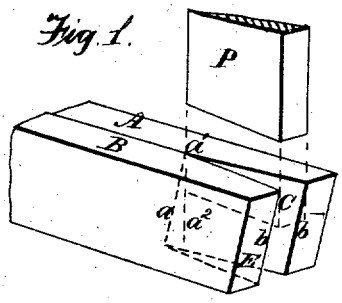
Figure 2:
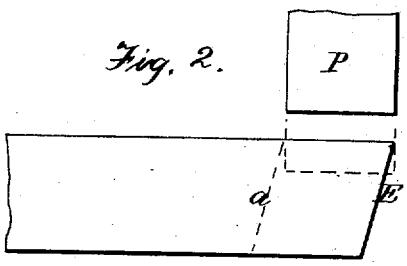
Figure 3:
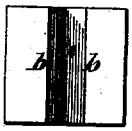
Figure 4:
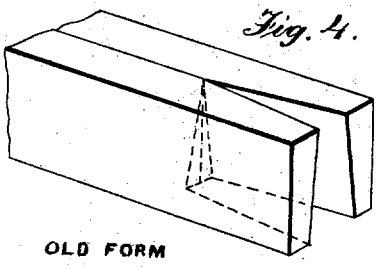

Figure 1 is a perspective view of my invention. Fig. 2 is a side elevation. Fig. 3 is an end elevation; and Fig. 4 is a perspective view, showing the old form of die.

Similar letters of reference in the accompanying drawings denote the same parts.

The stationary cutting-dies ordinarily employed for trimming or pointing horseshoe-nails after they have been cut from the blanks have heretofore been provided with an opening or channel, wedge-shaped or beveled in the direction both of its length and breadth, for the purpose of pointing the nail when acted on by the movable plunger, and, at the same time, permitting the clearance of the nail by the divergence of the side faces of the channel from the cutting-edge. This channel was bounded on each side by the inclined faces, and at the inner end by a triangular face, parallel with the line of movement of the plunger. The acute angle of this triangular face coincided with that of the cutting-edges. The face of the die was therefore of the shape required to give the proper form to the nail; but any section through the die parallel to this face would show not a triangular space, but a truncated wedge.

The result of this construction was, that after the face had been ground several times for the purpose of sharpening the die, the channel became too large on the cutting-face of the die, and did not fit the punch or male die, or answer the purpose for which it was intended; hence, such dies became inoperative after repeated sharpenings.

To obviate this defect is the object of my invention, which consists in forming the wedge-shaped space in the block with its sides or walls converging and intersecting in a line which is inclined to the path of the punch. Further, the walls of this wedge-shaped slot are at the same angle to each other throughout, so that a section in any part parallel to the cutting-face gives precisely the same shape in the slot, and if the punch be made to pass through the slot with its edge in contact with the bottom of the said slot, its sides will pass also in contact with the walls. This shape of the slot, therefore, allows its face to be ground without enlarging or changing the face of the slot; but unless the direction of the punch be changed, no clearance would be secured. This, however, is accomplished by the inclination referred to above. The punch is made to pass in close contact with the walls at the angle of their intersection at the face, but diverges from the line of said intersection as it progresses, so that the end of the punch, after passing the cutting-edges, moves clear of the walls. This gives the same clearance as when the opening was made in the old form, and, at the same time, allows the upper part of the die to be ground away in sharpening without changing the form of the space.

In the accompanying drawings, A and B represent two pieces of steel, doweled together to form the stationary die, one end of which is provided with an opening or channel, C, being beveled or inclined from the line $a\ a'$, where they intersect, to the outer end of the die. The angle which the side faces of the channel or opening in the female die make with each other may be varied at pleasure, but are the same the entire depth, so that the longitudinal sections of the channel are alike in shape wherever made in the die, and the die may be repeatedly sharpened and its cutting-face will still retain precisely the original form, thus obviating the defect in the ordinary die alluded to above, and shown in Fig. 4.

The edge of the punch enters at $a'$, and moves in the direction of the dotted line $a'\ a''$, which line forms an acute angle with the line $a\ a'$. In this way the nail is cleared from the die.

After grinding the face of the female die it will be necessary to adjust the latter so as to make the line $a\ a'$ intersect the path of the edge of the punch at the point of entrance. The male die P is beveled on both its side faces, to adapt it to the channel in the female die, in which it is made to operate.

I claim as my invention—

An improved device for trimming the edges of horseshoe-nails, consisting of a metallic block with a slot extending across one side, the walls of which slot converge and intersect one another along a line following a rectilinear and an undercut or inclined direction in relation to the path of the punch, and of a punch corresponding in shape transversely to the angular slot in the plane of its cutting angles, substantially as described.

JOHN H. ZOTTMAN.

Witnesses:
JOEL H. LUCIA,
SAML. S. GAINES.